United States Patent
Lenart

(10) Patent No.: US 9,945,754 B2
(45) Date of Patent: Apr. 17, 2018

(54) UNDERWATER LIGHT LEAKAGE DETECTION APPARATUS

(71) Applicant: Steve Lenart, West Palm Beach, FL (US)

(72) Inventor: Steve Lenart, West Palm Beach, FL (US)

( * ) Notice: Subject to any disclaimer, the term of this patent is extended or adjusted under 35 U.S.C. 154(b) by 108 days.

(21) Appl. No.: 14/999,155

(22) Filed: Apr. 4, 2016

(65) Prior Publication Data

US 2017/0284888 A1 Oct. 5, 2017

(51) Int. Cl.
*G01M 3/20* (2006.01)
*E04H 4/14* (2006.01)

(52) U.S. Cl.
CPC .............. *G01M 3/20* (2013.01); *E04H 4/148* (2013.01)

(58) Field of Classification Search
CPC .... G01M 3/3245; G01M 3/3236; G01M 3/32; G01M 3/329; G01M 3/36; G01M 3/363; G01M 3/20; G01M 3/22; G01M 3/226; E04H 4/148
USPC .................................................. 73/49.2, 49.3
See application file for complete search history.

(56) References Cited

U.S. PATENT DOCUMENTS

| | | | | |
|---|---|---|---|---|
| 3,407,337 A | * | 10/1968 | Benham | H02H 3/33 307/326 |
| 5,261,269 A | * | 11/1993 | Barker | G01M 3/226 222/174 |
| 6,637,258 B1 | * | 10/2003 | Foreman | G01M 3/226 222/174 |
| 2005/0016261 A1 | * | 1/2005 | Yoncuski | G01M 3/2815 73/40.5 R |
| 2014/0260548 A1 | * | 9/2014 | Marino | G01M 3/02 73/40 |
| 2017/0030796 A1 | * | 2/2017 | Marino | G01M 3/226 |

* cited by examiner

*Primary Examiner* — John Fitzgerald
*Assistant Examiner* — Truong D Phan

(57) ABSTRACT

A housing is provided having a leak detection tube in liquid communication with the inside of the housing. The housing is adapted to be affixed to a wall surface of a swimming pool over a suspected leak area below the surface of the water by a lockable connector mounted on the housing. A suitable dye substance then is inserted into the distal top or free end of the leak detection tube while the latter is positioned just below the surface of the swimming pool water by a leak specialist positioned on the deck or beam of the pool. A light fixture may be mounted in the wall surface and the aforementioned leakage test conducted to determine water leaks in the niche containing the light fixture.

2 Claims, 3 Drawing Sheets

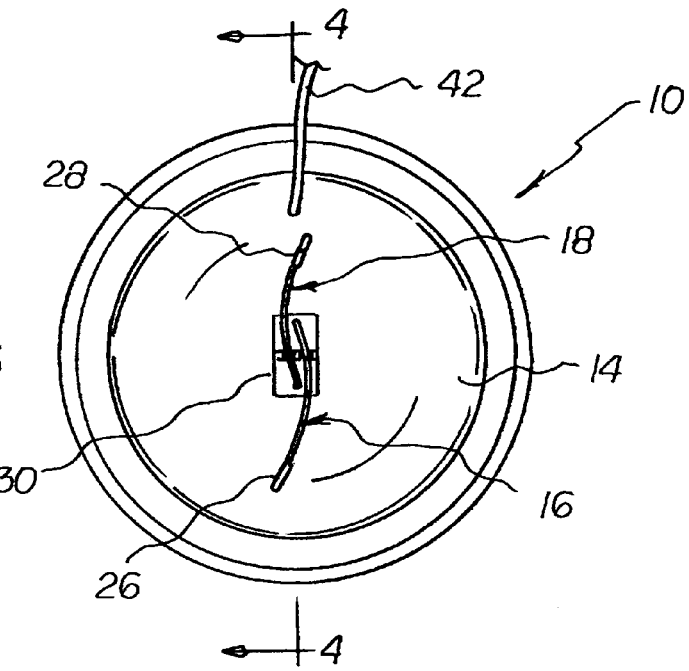
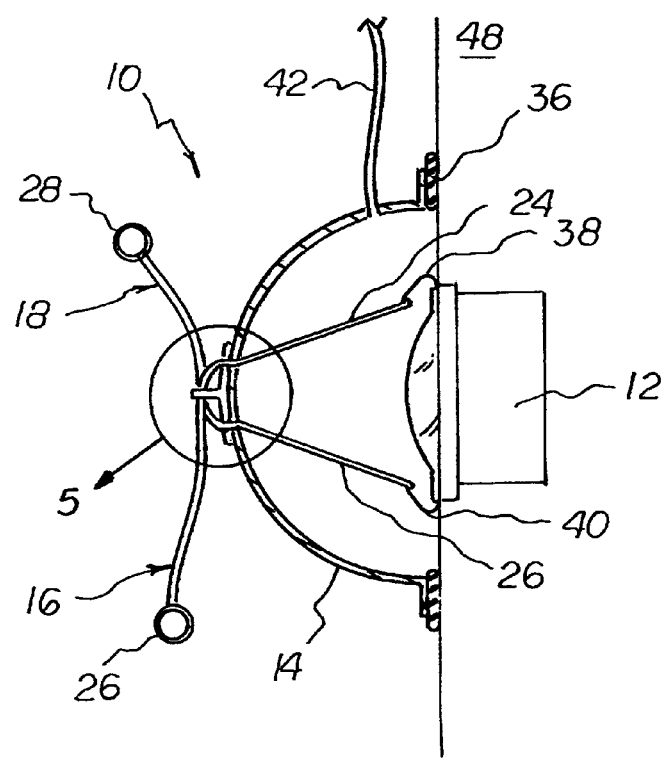

UNDERWATER LIGHT LEAKAGE DETECTION APPARATUS

RELATED APPLICATION

The present application claims priority for all purposes on and of my prior provisional application, Ser. No. 62/178,168, filed Apr. 3, 2015, entitled: Underwater Light Leakage Apparatus. By this reference, my prior pending provisional application, Ser. No. 62/178,168 etc., is hereby incorporated in and made part of this application.

BACKGROUND OF THE INVENTION

Field of the Invention

The present invention relates generally to underwater leak detector devices and methods, and more particularly, to a novel apparatus for detecting unwanted leakage through swimming pool underwater light fixtures without requiring the person conducting the leak investigation to do so immersed underwater in the swimming pool.

Description of the Prior Art

It is well known in the swimming pool art to provide various devices for detecting leaks through cracks in the drain system of the pool or through cracks or unwanted openings elsewhere in the pool structure. One known prior art solution is to place a dye in the pool water in the vicinity of the drain (or suspected crack) and to observe the motion of the dye. This usually requires A pool leak specialist to enter the water of a filled pool and be submerged during the dye placement and observant process. U.S. Pat. No. 5,065,690 discloses such a process.

Because application or placement of the dye underwater in the pool is so inconvenient, other solutions have been proposed where the dye insertion device is supported on the end of a pole and the pole is used as an extension to locate the dye application process underwater in the vicinity of the expected leak. Examples of these latter devices are disclosed in U.S. Pat. Nos. 5,261,269 and 6,637,258, respectively. They suffer from the disadvantage however of rendering difficult visibility of the dye in the suspected leak area because the investigator is usually remotely located on the coping of the pool holding the distal end of the pole.

In U.S. Pat. No. 5,734,096, a pool leak detector apparatus is described where a floating funnel is connected via a tube to the end of a pole inserted in the pool water and the level of water in the floating funnel is observed. While this organization improves visibility of the leak detection process somewhat, using a floating funnel and observing the water level in the funnel is not precise, requires a relatively long period of time to detect slow leaks, and requires extra components including a tether to maintain the funnel in a reasonably stable position relative to pool structure and the person holding the pole.

In those cases where the suspected leakage is through a crack or unwanted opening in the receptacle or niche of a pool dome-light fixture, or in the conduit for the wiring of the pool light, the aforementioned prior art leakage detectors where a pole is employed are difficult to use because of the relatively high mounting position of the light fixture on the swimming pool wall. A need exists therefore for an improved leakage detector for swimming pool light fixture assemblies and methods of using same where the detector apparatus is not mounted on a pole, and where the leakage detector specialist does not have to enter the water of the swimming pool to conduct the leakage test.

In order to overcome the forgoing disadvantages of the prior art pool leak detection devices and/or methods, and to meet the foregoing need, the present invention fully discloses in this specification a new and improved swimming pool underwater light leak detection apparatus and method which can provide easy and rapid observance of a detected leak event without entering the water of the pool and being submerged, and wherein the apparatus contemplated is not only easy to use, but is easy to fabricate and therefore low in cost.

The foregoing desired characteristics are provided only by the unique underwater pool light leak detection apparatus of the present invention as will be made apparent from the following description thereof. Other objects and advantages of the present invention over the prior art also will be rendered evident.

SUMMARY OF THE INVENTION

To achieve the foregoing and other objects and advantages, the present invention, briefly summarized, provides apparatus for detecting swimming pool leaks primarily occurring through cracks or unwanted openings in the light niche of a pool, or in the pool light's wire conduit, comprising a sealer dome having a deformable sealer dome gasket for forming a watertight seal against the wall surface of the swimming pool surrounding the light fixture mounted in such wall and being investigated for leakage. A leak detection tube is connected to the sealer dome and is in liquid communication with the inside of the sealer dome. Carried on the sealer dome is a pool light attachment mechanism in the form of one or more hooks adapted to be affixed to the peripheral edge portions of a pool light assembly. A pull cord attached to each hook extends through a corresponding water-tight opening in the sealer dome and can be pulled by a pool leak specialist to cause the sealer dome to be pressed in watertight sealing engagement against the wall in surrounding relation to the light assembly. A suitable lock member on the exterior of the sealer dome is provided such that the pull cord or cords can, under tension, be locked to a suitable bracket on the sealer dome and thereby to affix the sealer dome assembly in place.

In use, the sealer dome is positioned over a light fixture by the leak specialist on the deck of the pool. The sealer dome is attached in place by inserting the hooks into or under the peripheral frame portion of the light fixture, pulling on the attaching cords until the sealer dome is against the swimming pool wall, and then locking the cords under tension in place on the exterior bracket on the sealer dome. The leak detection tube next is positioned with its top end portion just below the surface of the pool water so it is easily visible. A conventional syringe may then be employed to inject dye into the top end of the leak detection tube and observed from a position above the surface of the pool water. If the dye remains still or relatively motionless, there isn't any leakage. If the dye begins to move down or along the leak detection tube, there is a leak somewhere between in the wall receptacle or niche of the light fixture in which the light fixture is mounted. The swimming pool light fixture receptacle thus may be tested for leaks easily in a matter of minutes without need of the leak specialist to enter the pool water, and any telling motion of the dye is easily and distinctly observable.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting. As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is an object of the present invention to provide a new and improved swimming pool light leakage detection apparatus which may be easily and efficiently manufactured and marketed.

It is a further object of the invention to provide a new and improved swimming pool light leakage detection apparatus which is of durable and reliable construction.

An even further object of the present invention is to provide a new and improved swimming pool light leakage detection apparatus which is susceptible of a low cost of manufacture with regard to both materials and labor, and which accordingly is then susceptible of low prices of sale to the consuming public, thereby making such underwater drain leakage detection apparatus invention available to the buying public.

It is an object of the present invention to provide a new and improved swimming pool light detection apparatus that provides an easily visible indicator for showing whether a leak is present in the light receptacle system of a swimming pool.

It is a further object of the present invention to provide a new and improved swimming pool light leakage detection apparatus that facilitates the application of dye to a leak detection tube just below the top water surface of a swimming pool.

Yet, another object of the present invention to provide a new and improved swimming pool light leakage detection apparatus that facilitates observing dye inserted into to a leak detection tube positioned just below the top water surface of a swimming pool from an observation position or location above the top water surface of the swimming pool.

An even further object of the present invention is to provide a new and improved swimming pool light leakage detection apparatus that facilitates the application of dye to a leak detection tube positioned just below the top water surface of a swimming pool wherein the leak detection tube is attached to a light fixture sealer dome, and wherein the leak detection tube is in fluid communication with the interior space defined by the sealer dome.

Yet still another object of the present invention is to provide a new and improved swimming pool light leakage detection apparatus that facilitates the application of dye to a leak detection tube positioned just below the top water surface of a swimming pool wherein the leak detection tube is attached to a light fixture sealer dome, wherein the leak detection tube is in fluid communication with the sealer dome, and wherein one or more attachment members activated by corresponding pull cords mounted on the sealer dome are provided to attach the sealer dome to the swimming pool wall surface and lock it into place such that a syringe containing dye can be employed to insert dye into the leak detection tube positioned just below the top water surface of a swimming pool as aforesaid and without need for the swimming pool leak detection specialist to enter the swimming pool water.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a front view of the preferred embodiment of FIG. 1 taken along line 3-3 of FIG. 1.

FIG. 4 is a cross-sectional view of the embodiment of the invention shown in FIG. 3 taken along line 4-4 of FIG. 3.

DESCRIPTION OF THE PREFERRED EMBODIMENTS

Figure 1:
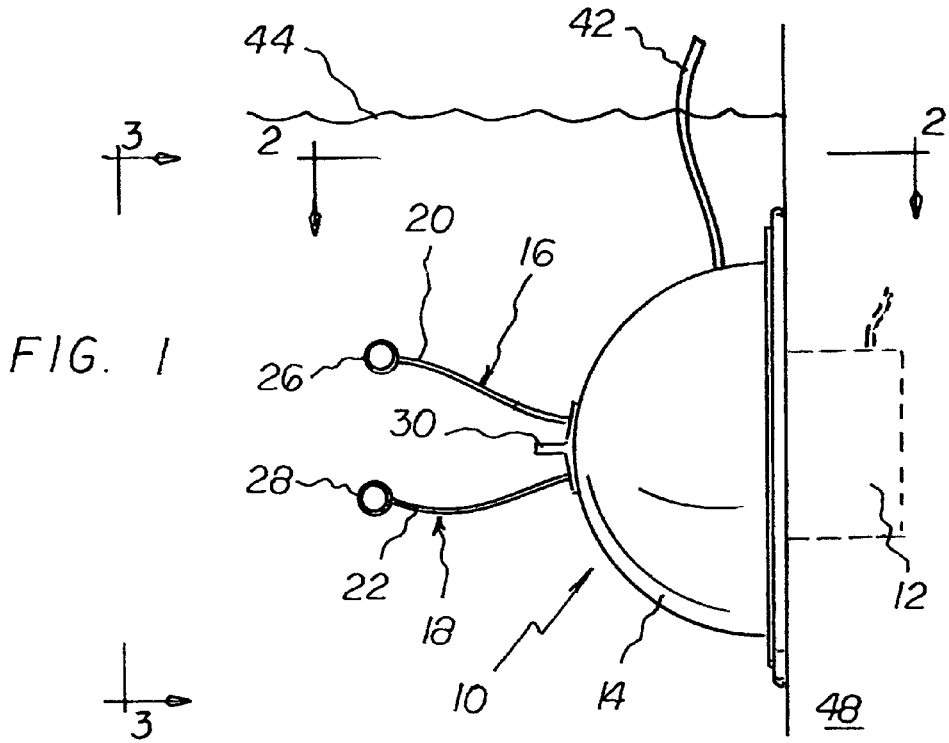
FIG. 1 is a side view showing a preferred embodiment of the underwater pool light leakage detection apparatus of the invention in place on the wall of a swimming pool in sealing relation to a pool light assembly mounted in a niche in the wall.
Figure 2:
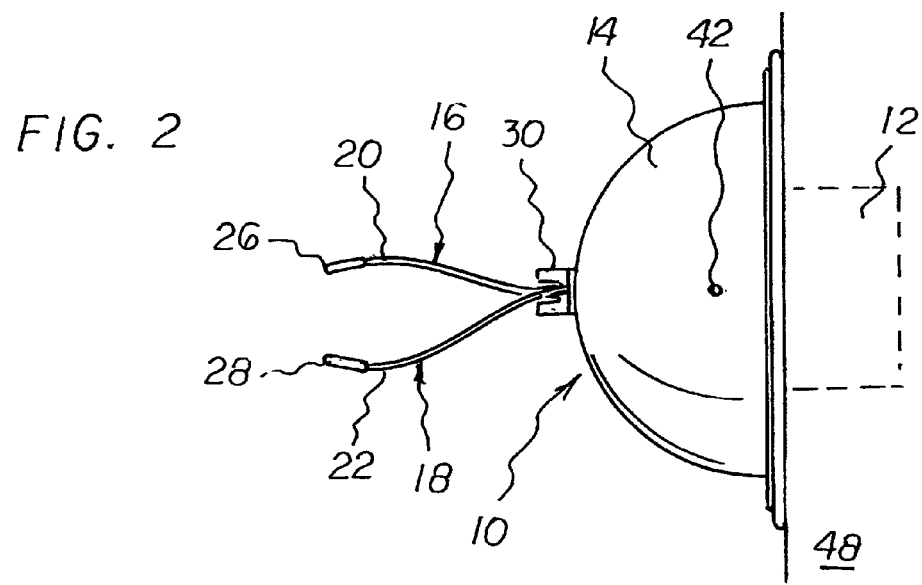
FIG. 2 is an enlarged plan or top view of the preferred embodiment of FIG. 1 taken along line 2-2 of FIG. 1.
Figure 5:
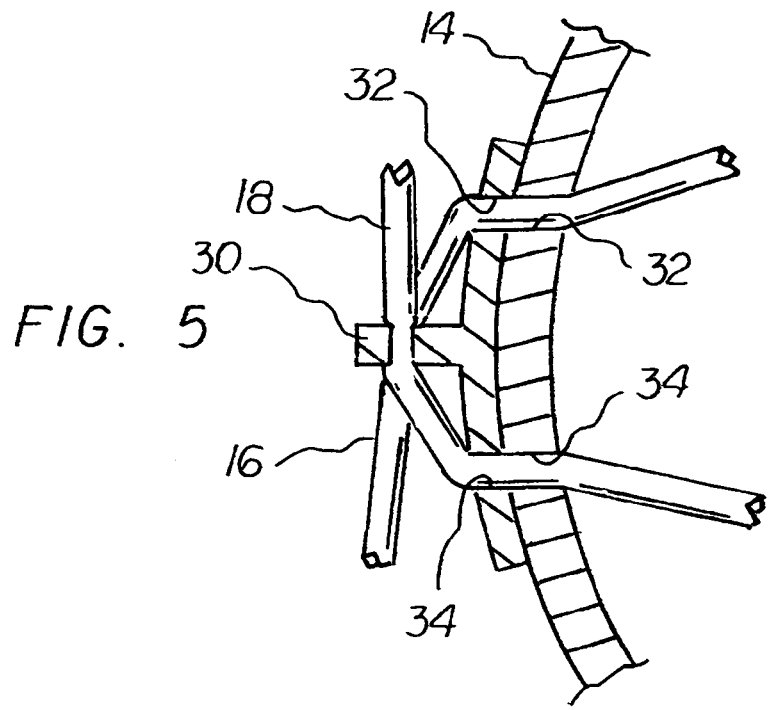
FIG. 5 is an enlarged fragmentary cross-sectional view of the top or crown portion of the sealer dome of the invention showing the cord locking bracket and the pull cords of the invention engaged therewith.

With reference to the drawings, a new and improved underwater light leakage detection apparatus embodying the principles and concepts of the present invention will be described in further detail.

Turning to FIGS. 1-6, there is shown a preferred embodiment of the underwater light leakage detection apparatus of the invention generally designated by reference numeral 10. In each of the figures, reference numerals are shown that correspond to like reference numerals that designate like elements shown in other figures.

In the preferred embodiment, the underwater light leakage detection apparatus 10 is used to detect water leaks in the niche or receptacle in which the swimming pool light fixture 12 and/or the wire conduit extending rearwardly therefrom is located. In this respect, the underwater light leakage detection apparatus 10 includes a sealing dome 14, and two pull cords 16, 18 each of which has a pulling end 20, 22 and an opposite connecting end 24, 26, respectively. It is contemplated that the pull cords 16, 18 be made of durable, rot resistant material, such as, but not limited to, plastic, bungee or rope.

The pulling ends 20, 22 of the pull cords 16, 18 are connected to pull cord rings 26, 28, respectively, which aid in the forming and maintaining of a watertight seal of the sealing dome 14 on the confronting surface of the swimming pool with respect to and surrounding the light fixture 12 and its associated light niche and wire conduit, substantially as depicted in FIGS. 1-4.

It is contemplated that the pull cord rings 26, 28 can be made of durable, rot resistant material, such as, but not limited to, plastic or metal. In accordance with the invention, the pull cords 16, 18 are pulled tight and then fastened in place to a pull cord lock bracket 30 suitably mounted exteriorly on top of the sealing dome 14 to secure the sealing dome in place (FIGS. 1-4) and form and maintain a watertight seal of the dome 14 with respect to the swimming pool light, light niche and conduit encompassed thereby. It is contemplated that the pull cord lock bracket 30 be made of durable, rot resistant material, such as, but not limited to, plastic or metal.

The pull cords 16, 18 extend through suitable watertight openings 32, 34 in the dome wall (FIG. 5) whereas the sealer dome 14 has a deformable sealer dome gasket 36 for forming a watertight seal in a location proximal and surrounding the swimming pool light fixture 12 substantially as shown in FIG. 4. The connecting ends 24, 26, of pull cords 16, 18 are fastened to individual solid, rigid, hook members 38, 40, respectively, which are adapted to securely engage and grip the peripheral edge portions of the light fixture 12 substantially a shown in FIG. 4. It is contemplated that the hook members 38, 40 can be suitably shaped for this purpose and be made of durable, rot resistant material, such as, but not limited to, plastic or metal.

Preferably, the pull cords 16, 18 are adapted to be pulled through watertight openings 32, 34 in the wall of sealer dome 12 when tension is applied to each of the pull cord rings 26, 28 and the sealer dome 14 is urged against the confronting swimming pool wall surface. By this action, and the corresponding action of the hook members 36, 38 engaging or gripping the light fixture periphery, the sealer dome 14, and sealer dome gasket 36 are caused to be compressed against the confronting wall surface 35 of the swimming pool over the light fixture 12 thus forming a watertight seal with respect to the swimming pool light fixture 12 and its light niche and wire conduit. The pull cord lock bracket 30 suitably locks the tensioned pull cords 16, 18 in place (FIG. 5) thus maintaining the watertight seal between the sealer dome, the sealer dome gasket, and the confronting swimming pool wall surface.

Pull cord lock bracket 30 preferably comprises a conventional solid, rigid, upstanding cord lock bracket cemented or otherwise affixed exteriorly to the top or crown portion of the sealer dome 14, substantially as depicted. In the preferred embodiment, good results have been achieved using a pull cord lock bracket found in any hardware store. Such a bracket has suitable openings-or slots for frictionally engaging each pull cord and keeping it locked in place on the bracket. It is contemplated that the pull cord lock bracket 30 be made of durable, rot resistant material, such as, but not limited to, plastic or metal. Although good results have been achieved utilizing a pull cord lock bracket of the type shown and described, it is contemplated to be within the scope of the invention that various other known locking devices could be used instead to selectively affix pull cords 16, 18 to the sealer dome per se once they have been tensioned to maintain the sealer dome in place substantially as depicted in FIGS. 1-4.

Figure 6:
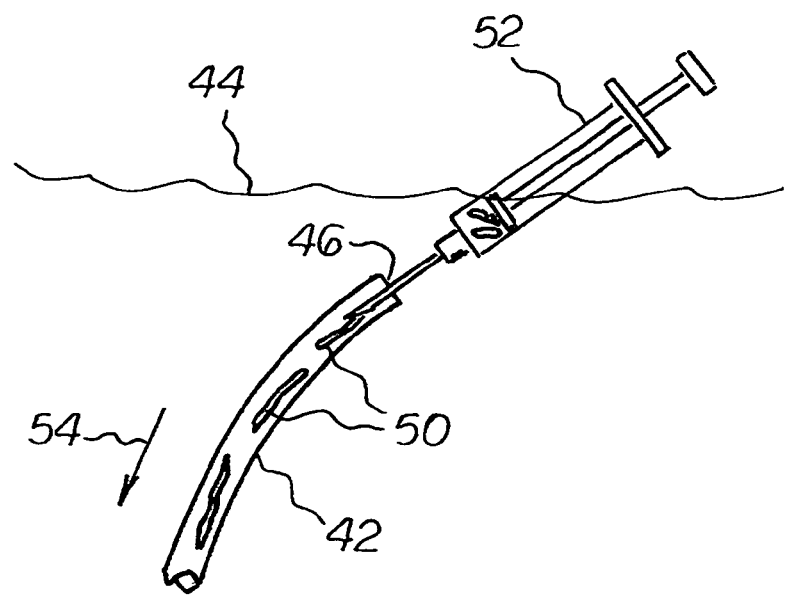
FIG. 6 is an enlarged view of the upper portion of the leak detection tube of the invention schematically showing the application of dye material into the leak detection tube by a syringe inserted into the open end of the leak detection tube immediately or proximally below the surface of water in a swimming pool.

A flexible leak detection tube 42 is connected to the sealer dome 14 and is in liquid communication with the interior hemispherical space defined by the sealer dome. Leak detection tube 42 extends from the sealing dome toward the surface 44 of the pool water substantially as depicted in FIGS. 1 and 6 such that the open top end 46 of the detection tube can assume an operative position immediately or proximally underneath the surface of the pool water 44 (FIG. 6). By this arrangement, the top portion of the leak detection tube 42 and especially open top end 46 easily can be accessed by a leak detection specialist (not shown) located on the deck or beam of the pool in order to conduct the water leakage test of the swimming pool light fixture 12 and/or its light niche and wire conduit. As schematically depicted in FIG. 6, the upper or top end portion of the leak detection tube 42 preferably is located or positioned proximally below the surface 44 of the swimming pool water adjacent to the section of the wall 48 of the pool where the light fixture being tested for leakage is located. Therefore, the leak detection specialist does not have to personally enter the water in the swimming pool to conduct the light leakage test as will become more evident below.

In the operation of the underwater light leakage detection apparatus 10 of the invention, for a typical pool light fixture 12 and its associated niche and wire conduit, a leak detection specialist would affix the sealer dome 14 over the pool light fixture located on the side of the pool beam with the deformable sealer dome gasket 36 engaging the side of the pool beam 10 to seal the swimming pool light fixture 12 off from the remainder of the water in the pool. The leak detection tube 42, which is attached to the sealer dome 14, is adjusted so that its top end portion lies just below the surface of the water 44, substantially as depicted in FIG. 6.

When the sealer dome 14 (and its gasket 36) is in watertight sealing condition on the wall of the swimming pool surrounding light fixture 12 FIG. 4), a column or continuous body of entrapped pool water will extend through the leak detection tube 42, the interior space of the sealer dome, and impinge against the swimming pool light fixture 12 and its niche, etc.

The leak detection specialist then can start the leakage test by injecting suitable dye material 50 into the detection tube 42 through the tube's top open end 46 located just beneath the surface of the pool water. This can be done preferably by using a conventional syringe 52 and injecting the dye material 50 through the top open end 46 of the leak detection tube 42, substantially as schematically depicted in FIG. 6.

At this start time, when the leakage test begins, if there is no water leakage in the swimming pool light fixture, its light niche or wire conduit, then the dye 50 will remain substantially stationary (not move) in the top end portion of the leak detection tube 42.

However, if there is in fact water leakage in or through the swimming pool light fixture, or its light niche or wire conduit, then the injected dye 50 will perceptibly move within the leakage detection tube 42 in a direction toward the sealer dome 14 (indicated by directional arrow 54). The lesser the traveling speed or velocity of dye movement, the lesser the light leakage. Conversely, the greater the travel velocity of the dye perceived in the top end portion of the leak detection tube 42, the greater the light leakage. It thus will be appreciated that the use of the injected dye material 50 into the top portion of the leak detection tube 42 visually enhances any movement of the column of water therein. Moreover, because the top potion of the tube 42 is located proximally under the surface 44 of the pool water, the effect of dye movement in the tube is easily and clearly visually observed seen by the leak specialist without having to enter the pool water.

In a preferred embodiment of the invention, sealer dome 14 and deformable gasket 36 preferably are fabricated of any suitable water impervious plastic or rubber moldable material. Good results have been achieved with the thickness of the sealer dome measuring between about ⅛ and about ⅜ inch thick. As mentioned, the sealer dome 14 is formed in a generally hemispherical configuration. Although good results have been achieved using this preferred configuration, it will be appreciated that any suitable shape or thickness can be used. Although good results have been achieved utilizing a deformable rubberized material for sealer gasket 36, it is contemplated to be within the scope of the invention that various other materials could be used instead, so long as the user can obtain a seal that allows the light leak detection apparatus 10 to achieve the utility described in this specification.

Many other variations of the invention are contemplated. For example, the pull cords 16, 18 comprise elongated flexible cords that could be either round or flat (rectangular) in cross-sectional shape. It is contemplated to be within the scope of the invention that the pull cords are not limited to two in number, additional cords can be used with their corresponding light fixture hook engagement members.

The leak detection tube 42 comprises a clear (transparent) flexible tube. It is contemplated that the leak detection tube 42 be made of durable, rot resistant material, such as, but not limited to plastic. The length of the leak detection tube 42 is made generally to conform to the depth of the light fixture 12 to just below surface 44 of the pool water. In the preferred embodiment, good results have been achieved using a leak detection tube 42 having dimensions as follows: a diameter of about ¼ inch and a length of about 20 to about 30 inches Although good results have been achieved utilizing this size, it is contemplated that various diameters and length can be used depending upon individual requirements.

Although good results have been achieved utilizing the "dome" shape of the underwater light leakage detection apparatus 10, as shown in the drawings of the preferred embodiment, it is contemplated to be within the scope of this invention that virtually any shape of light leak detection apparatus 10 could be utilized so long as the light leak detection apparatus 10 and its deformable sealer dome gasket are manufactured to permit a leak detection specialist to form an underwater seal over the opening (e.g. light niche) that is being detected for leaks.

The light leak detection apparatus 10 can also be utilized on spa lights or any other opening that the pool might have with the light leak detection apparatus 10 being placed over said opening so that the deformable sealer dome's gasket engages the side of the pool beam around said opening, as will occur to those of ordinary skill in the art.

Generally, the components of the underwater light leakage detection apparatus 10 of the invention can be made from inexpensive and durable metal, plastic or other suitable known materials.

As to further details of the manner of usage and operation of the present invention, the same is apparent from the above disclosure, and accordingly, no further discussion relative to the manner of usage and operation need be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use. For example, although the leak detection apparatus of the present invention is intended primarily to determine leaks in the light system of a swimming pool or the like, it will be apparent that the apparatus disclosed herein can be employed as well to identify and locate leaks occurring through cracks or other openings per se in the walls or floor of a swimming pool structure.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A leak detection apparatus for use in a swimming pool having water therein, said swimming pool further having a wall, a light fixture on said wall, said light fixture normally being located below the surface of said water in said swimming pool, said leak detection apparatus comprising:
   a housing,
   a leak detection tube, said leak detection having a first end and an opposed second end,
   wherein said first end of said leak detection tube is connected to said housing so as to be in fluid communication with said housing,
   wherein said leak detection tube second end comprises a distal free end, and
   a connector, said connector being supported on said housing for affixing said housing to a surface on said wall of said swimming pool,
   wherein said connector has a first end connected to said housing and a second end adapted to be affixed to said surface on said wall of said swimming pool,
   wherein said housing comprises a sealing dome,
   wherein said sealing dome provides a watertight seal surrounding said light fixture when said sealing dome is affixed to said surface on said wall of said swimming pool below said surface of the water of said swimming pool,
   wherein said connector second end includes a hook member for engaging said light fixture to affix said sealing dome to said swimming pool wall surface below said surface of the water of said swimming pool, and
   wherein said connector comprises at least one pull cord mounted for movement on said sealing dome, said sealing dome further including a lock member for locking said pull cord in a tensioned condition when said hook member on said second end thereof engages said light fixture whereby said sealing dome is caused to engage said swimming pool wall surface below said surface of the water of said swimming pool in a watertight manner.

2. The apparatus of claim 1 further including at least a second pull cord mounted for movement on said sealing dome, said at least second pull cord having a second hook member on a second end thereof for engaging said light fixture.

* * * * *